United States Patent Office 3,326,640
Patented June 20, 1967

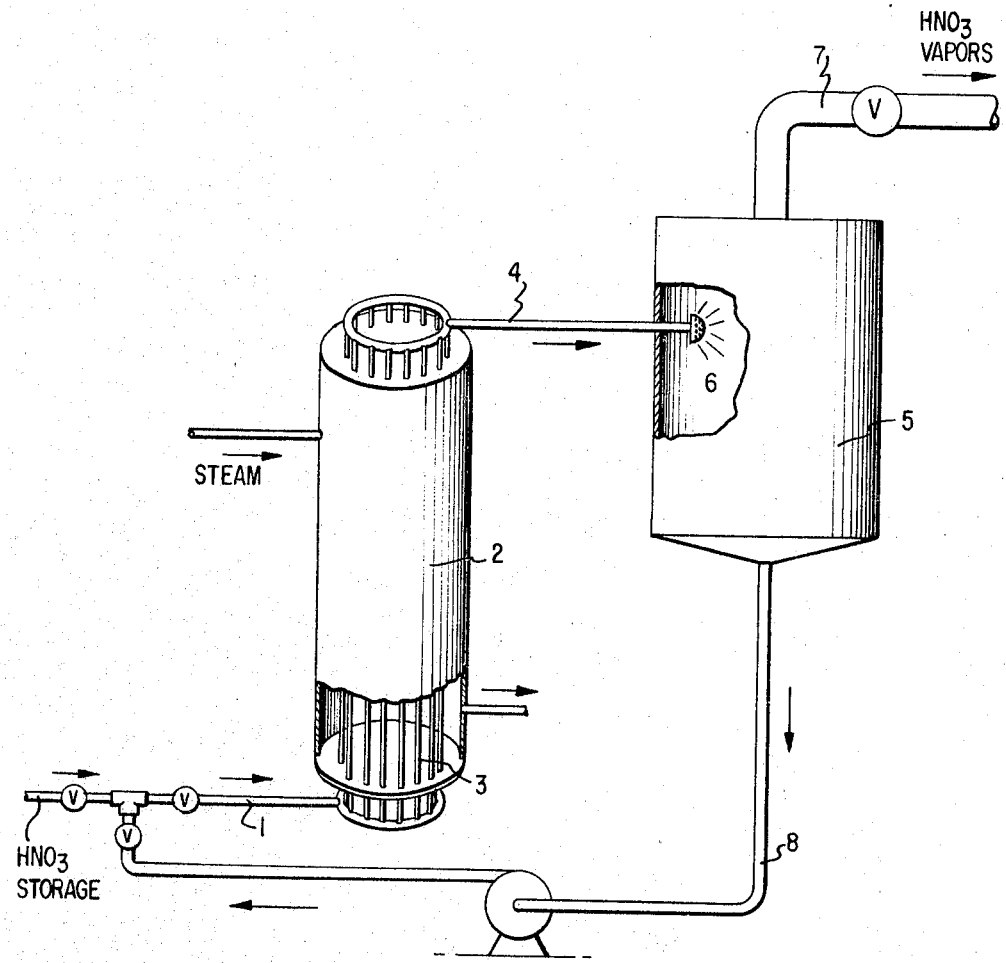

3,326,640
FLASH VAPORIZATION OF NITRIC ACID
Richard S. Egly, West Terre Haute, Ind., assignor to Commercial Solvents Corporation, a corporation of Maryland
Filed Mar. 2, 1964, Ser. No. 348,382
5 Claims. (Cl. 23—293)

The present invention relates to a method of vaporizing nitric acid, particularly to avoid excessive corrosion by the vapors. More particularly, the present invention relates to an improved method of producing nitric acid vapors especially for use in the nitration of alkanes, e.g., methane, propane, etc., at elevated temperatures and pressures to bring about a reaction with results in the formation of nitroparaffins with some aldehydes, alcohols, acids, etc., as oxidation by-products. The present invention may be similarly used to produce nitric acid vapors for use in other reactions such as the nitration of ammonia to produce ammonium nitrate.

In the nitration of propane, for example, vapors of nitric acid and propane are contacted at elevated temperatures of approximately 250 to 450° C. and at pressures of about 100 to 250 pounds/square inch gauge (p.s.i.g.) to produce nitroparaffins. In this operation, an important technical problem is presented by the necessity of vaporizing nitric acid. The hot nitric acid about to become vaporized is highly corrosive to metal surfaces. Vessels made of special cast iron alloys are capable of withstanding such corrosive conditions, but such vessels are quite brittle and susceptible to breakage because of thermal shock. Such brittleness substantially precludes the use of relatively large evaporating vessels made of these materials. Furthermore, metals which withstand boiling nitric acid are often less resistant to nitric acid vapors. Additionally, such resistant metals like high silicon iron are expensive and difficult to fabricate. Tantalum is even more expensive and difficult to fabricate. Stainless steels which are readily available and resistant to liquid nitric acid at ordinary temperatures are rapidly corroded by boiling nitric acid at pressures above atmospheric. While various procedures have been proposed for using a high silicon iron, glass or other resistant but fragile vessel or liner inside of a stainless steel vaporizer, transfer of heat required to heat the liquid inside of this type of vessel has always been difficult.

It is an object of the present invention to provide an improved process of vaporizing nitric acid. Another object of the present invention is the provision of a two-stage process of heating liquid nitric acid in a vessel of low resistance to boiling nitric acid but having good heat transfer characteristics and vaporizing the nitric acid in a second vessel of a material resistant to nitric acid vapors to avoid the corrosion problems experienced heretofore. It is a further object of the present invention to provide an improved process for vaporizing nitric acid for use in nitrating organic compounds according to which the nitric acid is vaporized without the corrosion problems heretofore experienced. Other objects of my invention will become apparent by the following more detailed description.

In accordance with the process of the present invention which includes two stages, liquid nitric acid is first heated in one vessel under a pressure sufficient such that the liquid can be heated to a temperature well in excess of the boiling point of nitric acid at the pressures under which nitric acid vapors are required without, however, approaching the boiling point of nitric acid at the operating pressure of the heater. Thereafter, the hot liquid nitric acid is flashed to about the pressure at which nitric acid vapors are desired in a second vessel of a material resistant to vaporizing and condensing nitric acid. At the lower operating pressure of this vessel a portion of the nitric acid will vaporize and be available for the process requiring nitric acid vapors, for reaction, e.g., nitration of a lower alkane. The unvaporized acid may be pumped to the higher operating pressure of the liquid acid heater and recycled.

The liquid nitric acid heater used in the present invention may be of any material which will withstand the necessary temperature, pressure and corrosive action of the liquid nitric acid but having good heat transfer characteristics to provide sufficient heat transfer to heat the liquid nitric acid to the desired temperature. It has been found preferable to use stainless steel for the parts which come into contact with liquid nitric acid. The liquid nitric acid heater can advantageously be a stainless steel tubular heater or vessel. It can also be made of the chrome irons.

The vaporizing vessel into which the hot liquid nitric acid is flashed is constructed of a material resistant to vaporizing and condensing nitric acid. Suitable materials for the construction or lining of this reaction vessel which have no negative effect on the reaction and which are not substantially corroded by the nitric acid vapors are high silicon iron, glass, glass-lined, fused silica vessels and the like.

The temperatures and pressures utilized in each stage or step of the process are essentially dependent upon the pressure under which the nitric acid vapors are required for further processing. If desired, however, the pressure of the nitric acid vapors may be adjusted as desired following vaporization of the hot liquid nitric acid. The liquid nitric acid heater is preferably operated at a temperature and pressure well in excess of the temperature and pressure under which the nitric acid vapors are desired but does not approach the boiling point of the nitric acid at the operating pressure of the liquid nitric acid heater.

It has been found advantageous to limit the exit temperature of the nitric acid from the liquid acid heater to about 20° C. below, preferably 50° C. below, the boiling point of the nitric acid at the heater's operating pressure to avoid excessive corrosion of the stainless steel. Generally, the liquid nitric acid heater may be operated at pressures generally from about 100 to 2000 p.s.i.g. to provide nitric acid vapors at desired pressures, e.g., atmospheric to 250 p.s.i.g. for the nitration of alkanes, for instance. The corresponding temperatures in the heater are generally from about 150° to 300° C.

If the nitric acid vapors are required at a pressure sufficiently high to necessitate placing the silicon iron, glass or other material resistant to nitric acid vapors inside a stainless steel vessel, it is desirable to keep the temperature of the stainless steel above the boiling point of nitric acid at the operating pressure of this vessel to avoid condensation of nitric acid vapors on the stainless steel and its consequent corrosion. However, since little or no heat transfer to the nitric acid is necessary, in the second vessel, only a modest amount of heat is required.

The invention will be described in more detail by reference to the accompanying drawing which illustrates an arrangement of apparatus suitable for carrying out the improved process of the invention. The sole figure is a process flow diagram for the present invention.

As illustrated in the accompanying drawing, liquid nitric acid is introduced into a stainless steel tubular heater 2 through line 1. The liquid nitric acid in heater 2 is under a pressure in excess of the pressure at which the nitric acid vapors are required. The temperature of the liquid nitric acid is increased to approximately 20° C. below the boiling point, e.g. about 265° C., of the nitric acid at the heater's operating pressure, e.g. 1000 p.s.i.g., as the liquid nitric acid passes through tubes 3 of heater 2. The temperatures and pressures employed in heater 2 are advantageously high since this results in a higher percentage vaporization of the acid thereby minimizing recycle of liquid nitric acid to the heater. The hot liquid nitric acid is then passed from heater 2 through stainless steel line 4 containing a cooling jacket 10 to an atomizing nozzle or expansion valve 6 arranged in vaporizing vessel 5.

The pressure of the vaporizing vessel 5, e.g. about 100 p.s.i.g., is correlated to the pressure and temperature of the liquid nitric acid in heater 2 so that as the pressure on the liquid nitric acid is reduced through nozzle 6, a substantial portion of the liquid vaporizes. The liquid nitric acid in heater 2 is heated to a temperature in excess of the boiling point of nitric acid at the operating pressure of the vaporizing vessels. The hot nitric acid vapors produced in vessel 5 are removed as desired through line 7. The unvaporized, liquid nitric acid remaining in vessel 5 is removed through line 8 and pumped up to the operating pressure of the liquid acid heater 2 and recirculated through the heater tubes 3 as shown.

The temperature and pressure employed in the vessel 5 ordinarily correspond to those of the process requiring nitric acid vapors, e.g. to those employed in nitration processes, and are rependent upon the characteristics of the particular use to which the nitric acid vapors are to be placed. It may, however, be desirable where the nitric acid vapors are required for a number of processes to produce the vapors at a high pressure and reduce the pressure as desired.

Obviously, many modifications and variations of the present invention are possible in light of the above teachings. It is therefore to be understood that within the scope of the appended claims the present invention may be practiced otherwise than as specifically described.

It is claimed:

1. A process for the vaporization of nitric acid using a heater made of a material resistant to hot liquid nitric acid and a vaporizer which comprises heating liquid nitric acid in the heater to a temperature in excess of the boiling point of nitric acid at the pressure under which nitric acid vapors are desired in the vaporizer but under a pressure sufficient that the liquid can be heated to said temperature without approaching the boiling point of nitric acid at the operating pressure of the heater, thereafter flashing the hot liquid nitric acid into the vaporizer of a material resistant to vaporizing nitric acid and operated at a pressure lower than the pressure of said heater to provide the nitric acid vapors.

2. The process of claim 1 wherein said liquid nitric acid is heated to a temperature approximately 20° C. below the boiling point of nitric acid at the operating pressure of said heater.

3. The process of claim 1 wherein the operating pressure of said flash vessel is at least as high as said desired pressure of the nitric acid vapors.

4. A process for the vaporization of nitric acid whereby excessive corrosion by the nitric acid vapors is avoided which comprises heating liquid nitric acid in a stainless steel heater to a temperature in excess of the boiling point of nitric acid at the pressure under which nitric acid vapors are desired but under a pressure sufficient such that the liquid can be heated to said temperature without approaching the boiling point of nitric acid at the operating pressure of the stainless steel heater, thereafter flashing the hot liquid nitric acid into a vessel of a silicon iron material resistant to vaporizing nitric acid and operated at a pressure lower than the operating pressure of said heater and below the pressure under which nitric acid boils at said temperature, and removing nitric acid vapors formed in the flash vessel.

5. A process for the vaporization of nitric acid whereby excessive corrosion of the vapors is avoided which comprises heating liquid nitric acid in a stainless steel heater to a temperature from about 150 to 300° C. and well in excess of the boiling point of nitric acid at the pressure under which nitric acid vapors are desired but at a pressure from about 100 to 2000 p.s.i.g., and sufficient such that the liquid can be heated to said temperature without approaching closer than approximately 50° C. of the boiling point of nitric acid at the operating pressure of the heater, and flashing the hot liquid nitric acid into a vessel of a material resistant to vaporizing and condensing nitric acid and operated at a pressure from about atmospheric to 250 p.s.i.g. and lower than the pressure in the nitric acid heater to provide nitric acid vapors.

References Cited

UNITED STATES PATENTS

| 1,901,875 | 3/1933 | Kirst | 23—160 |
| 1,906,399 | 5/1933 | Montgomery | 159—2 |
| 2,711,388 | 6/1955 | Moltern | 159—47 |
| 2,716,631 | 8/1955 | Bechtel | 23—160 |
| 2,954,013 | 9/1960 | Stengel | 203—88 |
| 3,106,515 | 10/1963 | Williams | 203—13 |

NORMAN YUDKOFF, *Primary Examiner.*

G. HINES, *Assistant Examiner.*